United States Patent
Bannister

[15] 3,697,503
[45] Oct. 10, 1972

[54] LINCOMYCIN ISOTHIOURONIUM SALTS AND PROCESS FOR PREPARING SAME

[72] Inventor: Brian Bannister, Kalamazoo, Mich.
[73] Assignee: The Upjohn Company, Kalamazoo, Mich.
[22] Filed: Nov. 3, 1969
[21] Appl. No.: 873,716

[52] U.S. Cl. .............................. 260/210 R, 260/999
[51] Int. Cl. .............................................. C07c 47/18
[58] Field of Search .................................. 260/210 R

[56] References Cited

UNITED STATES PATENTS 3,300,475  1/1967  Bannister ............... 260/210 R
3,366,624  1/1968  Argoudelis ................ 260/210

Primary Examiner—Lewis Gotts
Assistant Examiner—Johnnie R. Brown
Attorney—John Kekich and Roman Saliwanchik

[57] ABSTRACT

A peracylated trans-1-bromoglycoside is treated with thiourea in a tertiary amide, dipolar, aprotic solvent to form the corresponding peracylated cis- and trans-glycosyl isothiouronium salt, which is then converted to the corresponding peracylated 1-thioglycoses and alkyl peracylated 1-thioglycosides, and if desired, the cis anomers are isolated. 1-thioglycoses

18 Claims, No Drawings

3,697,503

1

LINCOMYCIN ISOTHIOURONIUM SALTS AND PROCESS FOR PREPARING SAME

BRIEF DESCRIPTION OF THE INVENTION

This invention relates to a process for converting peracylated trans-1-bromoglycoses to cis-1-thioglycosides and to novel compounds.

It is known that trans-1-thioglycoses, that is, 1-thioglycoses in which the 1-thio group is in the trans position with respect to the 2-hydroxy group, can be prepared by reacting a peracylated cis- or trans-1-bromoglycose with thiourea in acetone to form the corresponding isothiouronium salt, hydrolyzing this salt by mild alkaline hydrolysis to form the corresponding 1-thioglycose; and aklylating this 1-thioglycose, and deacylating the resulting peracylated 1-thioglycoside. This process yields trans-1-thioglycose isothiouronium salt, the trans-1-thioglycose, and the alkyl trans-1-thioglycoside.

In accordance with this invention, it has been found that when the reaction is carried out in a tertiary amide dipolar aprotic solvent, substantial quantities of the cis-anomers are formed.

Thus this invention involves the reaction of a peracylated trans-1-bromoglycose with thiourea in a tertiary amide dipolar aprotic solvent, for example, hexamethyl phosphoric triamide, dimethylformamide, and N-methyl-2-pyrrolidone, to form the corresponding 1-thioglycose isothiouronium salt, hydrolizing this salt by mild basic hydrolysis to free the corresponding 1-thioglycose, and concomitantly alkylating the 1-thioglycose thus formed to the corresponding alkyl 1-thioglycoside, and if desired, isolating the cis-anomer at any appropriate stage, and thereafter, if desired, removing the acyl group.

Peracylating refers to the replacement of all of the reactive hydrogen by a protective carboxyacyl group, suitably with acetyl or other alkanoyl groups, for example, propionyl, butyryl, valeryl, hexanoyl, heptanoyl, octanoyl, and the isomeric forms thereof, or with benzoyl or like aralkanoyl groups.

Advantageously, the hydrolysis and alkylation are effected at the same time as this minimizes decomposition of the 1-thioglycose. Advantageously, also the hydrolysis and alkylation steps are conducted in the presence of an antioxidant, for example, sodium bisulfite, sodium hydrosulfite ($Na_2S_2O_4$), sodium pyrosulfite (sodium metabisulfite, $Na_2S_2O_5$) and the like, to minimize disulfide formation or to reduce any disulfide as it is formed.

A suitable alkylating agent is methyl iodide. Other alkylating agents, however, can be used, for example, alkyl halides, dimethyl sulfate, alkyl p-toluenesulfonate, and the like.

The invention may be more fully understood by reference to the following examples in which the solvent ratios are volume to volume and the parts are by weight unless otherwise specified. It is to be understood, however, that while the invention is thus exemplified with a particular 1-bromo-β-glycose and the production of particular alkyl α-thioglycosides, the invention is not thus limited but is applicable to any trans 1-bromoglycose and to the production of the corresponding cis-alkyl thioglycoside.

2

EXAMPLE 1

Part A. 2'-Hydroxyethyl N-acetyl-2',2,3,4-tetra-O-acetyl-7-O-methyl 1-thio-α-lincosaminide

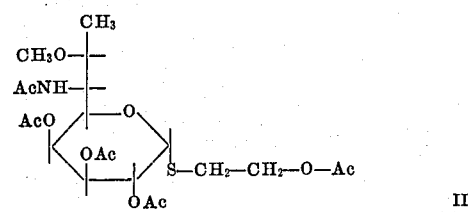

2'-Hydroxyethyl 1-thio-α-celestosaminide (1.0 gm.) (Example 3 of U.S. Pat. No. 3,255,174) was left overnight in solution in pyridine (25 ccs.) and acetic anhydride (12 ccs.). Removal of the solvent in vacuo gave a colorless oil which was dissolved in chloroform, washed with water, dilute aqueous hydrochloric acid, water, saturated aqueous sodium bicarbonate, water and dried over anhydrous sodium sulfate. Solvent removal in vacuo gave a syrup (2.03 gms.) which on crystallization from ethyl acetate-Skellysolve B yielded 2'-hydroxyethyl N-acetyl-2',2,3,4-tetra-O-acetyl-7-O-methyl-1-thio-α-lincosaminide (Formula II) in squat, colorless prisms, m.p. 143°–144° C. Skellysolve B is a brand of technical hexane.

Anal. Calcd. for $C_{21}H_{33}O_{11}NS$:
C, 49.68; H, 6.54; N, 2.76; S, 6.32%.
Found:
C, 49.66; H, 6.50; N, 2.91; S, 6.34%.
$[\alpha]_D$: +216° (c, 0.7746, $CHCl_3$)

Part B. Methyl N-acetyl-2,3,4-tri-O-acetyl-7-O-methyl-1-thio-α- and -β-lincosaminides

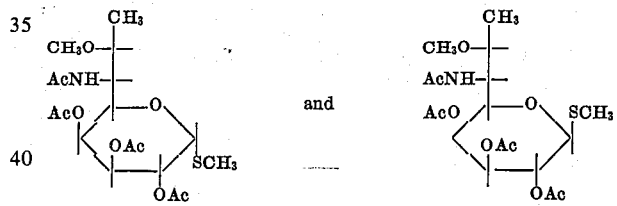

A solution of 5.05 gms. (1.62 ccs.) of bromine in 100 ccs. of chloroform was added over approximately 30 minutes from a pressure-equalized dropping funnel under anhydrous conditions to a stirred solution of 10 gms. of 2'-hydroxyethyl N-acetyl-2',2,3,4-tetra-O-acetyl-1-thio-α-celestosaminide prepared by the procedure of part A in 200 ccs. of chloroform. Initially, the bromine color disappeared immediately; later, a deep orange-red color developed. After stirring for an additional 30 minutes at room temperature, solvent was removed on a rotating evaporator at 40° C./7 mm., giving a yellow-orange syrupy residue. This was redissolved in chloroform, the solvent removed in vacuo, and the process repeated till the distillate became colorless, leaving a yellowish amorphous residue of 1-bromo-7-O-methyl-β-lincosamine tetraacetate of the formula

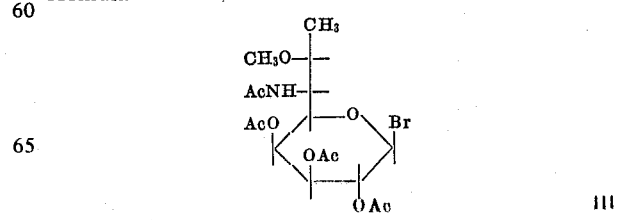

The residue was dissolved in 200 ccs. of dry dimethylformamide, 4.5 gms. of thiourea was added, and the reaction mixture (a colorless solution) stirred overnight at room temperature. There were thus formed the isothiouronium salts of the formulas

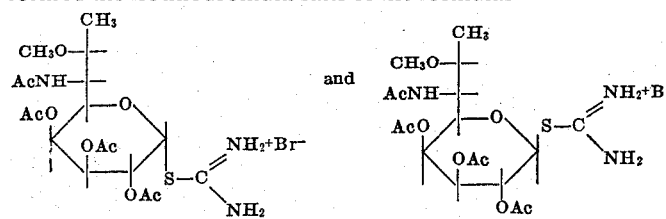

Without isolating these salts and after cooling in an ice-bath, 100 ccs. of water was added slowly, followed by 8.3 gms. of anhydrous potassium carbonate, 10.6 gms. of sodium bisulfite, and 28 gms. (12.3 ccs.) of methyl iodide. The mixture was stirred vigorously magnetically for 3 hours, the cooling bath being removed after 20 minutes.

Volatile materials were removed in vacuo at 40° C., and finally at 80° C./<1 mm. The yellow residue was dissolved in a mixture of chloroform and water, the aqueous layer extracted with chloroform, and the combined chloroform extracts were washed twice with water and dried over anhydrous sodium sulfate. Removal of the solvent in vacuo gave a colorless amorphous residue (6.48 gms.). Thin-layer chromatography (1 acetone:1 Skellysolve B) showed a major zone of product with a small zone of slightly higher $R_f$.

This material was chromatographed on silica gel (1.2 kilos, column dimensions 5.8 × 90 cms.) in the system 1 acetone:1.5 Skellysolve B. After a 500 cc. forerun, 50 cc. fractions were collected automatically, and elution of materials followed by thin-layer chromatography. Fractions nos. 145–173, inclusive, corresponded to the material of higher $R_f$, nos. 185–310, inclusive, corresponded to the major product, and nos. 174–184, inclusive, were a mixture of the two.

Removal of solvent in vacuo from combined fractions 145–173, inclusive, gave a colorless syrup (570 mgms.), which on crystallization from ethyl acetate-Skellysolve B yielded methyl N-acetyl-2,3,4-tri-O-acetyl-7-O-methyl-1-thio-α-lincosaminide in small colorless prisms, m.p. 212°–213° C.

Anal. Calcd. for $C_{18}H_{29}O_9NS$:
C, 49.64; H, 6.71; N, 3.22; S, 7.36; MeO, 7.13%; M.W. 435.49.
Found:
C, 49.72; H, 6.77; N, 3.36; S, 7.27; MeO, 7.08%.
$[\alpha]_D$: +229° (c, 0.7174, CHCl$_3$).
M. Wt: (Mass spec., M$^+$) 435.

Removal of solvent in vacuo from combined fractions 185–310, inclusive, gave slightly yellow amorphous solid (4.23 gms.), which on crystallization from ethyl acetate-Skellysolve B yielded methyl N-acetyl-2,3,4-tri-O-acetyl-7-O-methyl-1-thio-β-lincosaminide in colorless prisms, m.p. 187°–188° C.

Anal. Calcd. for $C_{18}H_{29}O_9NS$:
C, 49.64; H, 6.71; N, 3.22; S, 7.36; MeO, 7.13% M.W. 435.49.
Found:
C, 49.73; H, 6.95; N, 3.18; S, 7.64; MeO, 7.41%.
$[\alpha]_D$: +24° (c, 0.7484, CHCl$_3$).
M. Wt.: (Mass spec., M$^+$) 435.

EXAMPLE 2

Conversion of the trans-1-thioglycoside, methyl 6-acetamido-6-deoxy-2,3,4-tri-O-acetyl-1-thio-β-D-galactopyranoside to methyl 6-amino-6-deoxy-1-thio-α-D-galactopyranoside.

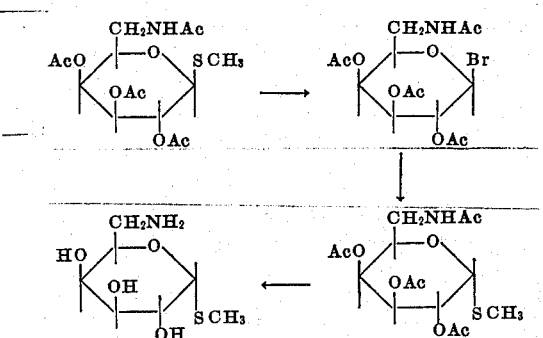

Part A–2: 6-Acetamido-6-deoxy-βD-galactopyranosyl bromide methyl 6-acetamido-6-deoxy-2,3,4-tri-0-acetyl-1-thio-β-D-galactopyranoside (21.59 gms., 1 mol.) was dissolved in chloroform (200 ccs.) in a 2 l. round-bottomed flask equipped with a magnetic stirring bar, a pressure-equalized dropping funnel, and a drying tube, and a solution of bromine (14.65 gms., 4.70 ccs., 1.6 mols.) in chloroform (200 ccs.) added slowly. After an initial destruction of the color of the bromine, the solution assumed an orange-red hue. After an hour at room temperature beyond the addition, solvent was removed on a rotating evaporator at 40° C./7 mm., the reddish-yellow syrupy residue redissolved in chloroform, (as above), solvent removed in vacuo, and the process repeated until the distillate was colorless.

Part B–2: Methyl 6-acetamido-6-deoxy-2,3,4-tri-O-acetyl-1-thio-α-D-galactopyranoside Thiourea (13.1 gms., 3 mols.) and hexamethylphosphoric triamide (200 ccs.) were added, and the mixture stirred overnight at room temperature (drying tube). The reaction mixture then was cooled in an ice-bath, potassium carbonate (anhydrous, 23.2 gms.) and sodium bisulfite (29 gms.) added, followed by water (200 ccs.) slowly, the reaction mixture tending to become warm and to effervesce. Methyl iodide (40 ccs., large excess) was then added slowly, again with effervescence, and the mixture stirred at room temperature for 3 hours.

All volatile solvent was removed on a rotating evaporator at 40° C./7 mm., the residual solution dissolved in chloroform, washed twice with water, and dried over anhydrous sodium sulfate. Solvent was removed on a rotating evaporator at 40° C./7 mm., and then by distillation under high vacuum from an oil-bath at 110°–120° C. The dark syrupy residue was dissolved in chloroform, washed with water, dried over anhydrous sodium sulfate, and the solvent removed at 40° C./7 mm.

The crude material was divided into two (16.4 and 16.5 gms.) and chromatographed separately on silica (3950 gms., column dimensions 10.5 × 93 cm.) in the system 1 acetone:1.5 Skelly-solve B (technical hexane). Fractions (50 cc.) were collected automatically after a forerun of 13.5 l. Fractions nos. 351–520, inclusive, were combined and yielded the α-anomer (1.63 gms.); fractions 581–900, inclusive, gave the β-anomer (5.67 gms.), while fractions nos. 521–580, inclusive, consisted of a mixture (1.21 gms.) of the two anomers. The second column behaved very similarly, and yielded 1.45 gms. of the α-anomer.

Fractions 521–900 were combined for recycling.

The α-anomer, methyl 6-acetamido-6-deoxy-2,3,4-tri-O-acetyl-1-thio-α-D-galactopyranoside, obtained initially as a syrup, crystallized readily from ethyl acetate-Skellysolve B in colorless, elongated platelets, m.p. 162°–163° C.

Anal. Calcd. for $C_{15}H_{23}O_8NS$:
 C, 47.73; H, 6.14; N, 3.71; S, 8.50%. Mol. Wt. 377.41

Found:
 C, 48.06; H, 6.50; N, 3.82; S, 8.69%.
 $[\alpha]_D$ +207° (c, 1.0006, chloroform).
 Mol. Wt. (Mass Spec., M+) 377.

Part B–3 Conversion of methyl 6-acetamido-6-deoxy-2,3,4-tri-O-acetyl-1-thio-α-D-galactopyranoside to methyl 6-amino-6-deoxy-1-thio-α-D-galactopyranoside The α-thioglycoside tetracetate of Part B–2 (3.08 gms.) was heated under gentle reflux with hydrazine hydrate (100 ccs.) for 24 hours (oil-bath at 155° C.). Solvent was removed by distillation from the colorless solution as completely as possible, finally under 7 mm. pressure giving a colorless syrup, which could not be induced to crystallize. The mixture was chromatographed on silica gel in the system 1 methanol:1 chloroform (v/v) till the faster moving contaminants were removed: the column was then stripped with methanol. Solvent removal then gave methyl 6-amino-6-deoxy-1-thio-α-D-galactopyranoside as a colorless syrup (1.03 gms.).

This product is useful for the same purposes as methyl 6-amino-6-deoxy-1-thio-α-D-galactooctopyranoside (α-MTL) as disclosed in U.S. Pat. No. 3,380,992 and moreover can be acylated with trans-1-methyl-4-propyl-L-2-pyrrolidinecarboxylic acid, and like acids, also as disclosed in U.S. Pat. No. 3,380,992, to form 7,8-bisnorlincomycin and analogs thereof useful as antibacterial agents.

The starting compound, 6-acetamido-6-deoxy-2,3,4-tri-O-acetyl-1-thio-β-D-galactopyranoside, was prepared as follows. 6-Amino-6-deoxy-β-D-galactopyranose [Szarek et al., Can. J. of Chem., 43, 2345 (1965) and Saeki et al., Annual Reports of the Sankyo Research Laboratories, 19, 137 (1967) (from 18.0 gms. of 6-amino-6-deoxy-1,2,3,4-di-O-isopropylidene-α-D-galactopyranoside] was dissolved in pyridine (100 cc.), acetic anhydride (50 cc.) added, the solution left overnight at room temperature, and solvent removed as completely as possible on a rotating evaporator at 40° C./high vacuum. Thin layer chromatography of the resulting brown syrup (silica gel, 1 acetone:1 Skellysolve B) showed one spot only. The syrup was dissolved in chloroform, washed with dilute hydrochloric acid (N), water, saturated aqueous sodium bicarbonate, water, and dried over anhydrous sodium sulfate. Removal of the solvent in vacuo gave a pale yellow syrup.

This pentaacetate (containing some α-anomer) was treated with a solution of anhydrous hydrogen bromide in glacial acetic acid (40 ccs., saturated at 0° C.), swirled by hand until all had dissolved and then left at room temperature for 3 hours. The tan, somewhat viscous reaction solution was diluted with chloroform (200 ccs.), and poured on ice. The chloroform layer was removed, the aqueous layer extracted with chloroform, and the combined extracts washed with cold water until the washings were neutral to Congo red indicating paper. The extracts were dried over anhydrous sodium sulfate, and the solvent removed on a rotating evaporator at 40° C./7 mm., to give an almost colorless syrup.

To the colorless syrup was added thiourea (5.01 gm., 3 mols.) and acetone (100 ccs.) and the mixture heated under gentle reflux on the steam-bath (Drierite tube) for 1½ hours, then left overnight at room temperature. To the reaction solution, cooled in an ice bath, was added potassium carbonate (anhydrous, 5.2 gms.), sodium bicarbonate (6.6 gms.), water (50 ccs.) and methyl iodide (10 ccs., large excess) and the mixture stirred vigorously magnetically for 2 hours.

Volatile solvent was removed on a rotating evaporator at 40° C./7 mm., the aqueous residue extracted with chloroform, and the extracts washed with water and dried over anhydrous sodium sulfate. Thin layer chromatography (silica gel, 1 acetone:1 Skellysolve B) showed one zone only, of very slightly higher Rf than the starting acetate, and distinguished from it also in that it showed up rapidly on being sprayed with periodate-permanganate reagent, which does not react with the pentaacetate. Removal of the solvent gave a colorless syrup (4.67 gms.).

Crystallization occurred from ethyl acetate-Skellysolve B to give the methyl 6-acetamido-6-deoxy-2,3,4-tri-O-acetyl-1-thio-β-D-galactopyranoside as colorless prisms, m.p. 116°–117° C.

Anal. Calcd. for $C_{15}H_{23}O_8NS$:
 C, 47.73; H, 6.14; N, 3.71; S, 8.50%. Mol. Wt. 377.41.

Found:
 C, 47.56; H, 6.11; N, 3.93; S, 8.69%.
 $[\alpha]_D$ +27° (c, 1.016, chloroform)
 Mol. Wt. (Mass spec., M+) 377.

I claim:

1. In a process for converting a trans-glycosyl halide to the corresponding isothiouronium halide by reaction with thiourea in a solvent, the improvement whereby substantial conversion to cis-isothiouronium halide is obtained characterized in that the solvent is a tertiary amide dipolar aprotic solvent.

2. The process of claim 1 in which the solvent is hexamethylphosphoric triamide.

3. The process of claim 2 in which the solvent is dimethyl formamide.

4. The process of claim 1 in which the trans-glycosyl halide is 6-acylamino-6-deoxy-2,3,4-tri-O-acyl-β-D-galactopyranosyl bromide or 1-bromo-7-O-methyl-β-lincosamine tetraacylate.

5. The process of claim 2 in which the trans-glycosyl halide is 6-acylamino-6-deoxy-2,3,4-tri-O-acyl-β-D- galactopyranosyl bromide or 1-bromo-7-O-methyl-β-lincosamine tetraacylate.

6. The process of claim 3 in which the trans-glycosyl halide is 6-acylamino-6-deoxy-2,3,4-tri-O-acyl-β-D-galactopyranosyl bromide or 1-bromo-7-O-methyl-β-lincosamine tetraaacylate.

7. The process of claim 1 in which the cis-isothiouronium halide, in admixture with the trans-isothiouronium halide or separated therefrom, is hydrolyzed to the corresponding cis-1-thioglycose and concomitantly alkylated to form an alkyl cis-1-thioglycoside.

8. The process of claim 7 in which the cis-isothiouronium halide is 6-acylamino-6-deoxy-2,3,4-tri-O-acyl-β-galactopyranosylisothiouronium bromide or the 1-isothiouronium bromide of 7-O-methyl-β-lincosamine tetraacylate.

9. In a process for converting glycosyl isothiouronium halides to 1-thioglycosides by hydrolysis to the corresponding 1-thioglycose and concomitant alkylation the improvement which comprises carrying out the reaction in the presence of an antioxidant thereby to minimize conversion of the 1-thioglycose to the corresponding disulfide.

10. The process of claim 9 in which the antioxidant is a bisulfite.

11. The process of claim 9 in which the glycosyl isothiouronium halide is 6-acylamino-6-deoxy-2,3,4-tri-O-acyl-β-galactopyranosyl isothiouronium bromide or the 1-isothiouronium bromide of 7-O-methyl-β-lincosamine tetraacylate.

12. The process of claim 11 in which the antioxidant is a bisulfite.

13. A compound of the formula

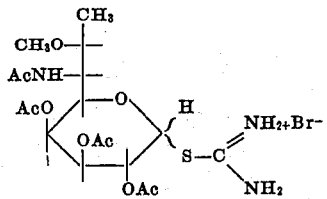

wherein Ac is lower alkanoyl or benzoyl.

14. A compound of claim 13 in which Ac is acetyl.

15. A compound of claim 13 in which the anomeric configuration is alpha.

16. A compound of claim 13 in which the anomeric configuration is beta.

17. A compound of claim 15 in which Ac is acetyl.

18. A compound of claim 16 in which Ac is acetyl.

* * * * *